April 30, 1946.   B. E. DAVIS   2,399,545
ADHESIVE TAPE
Filed Nov. 18, 1942
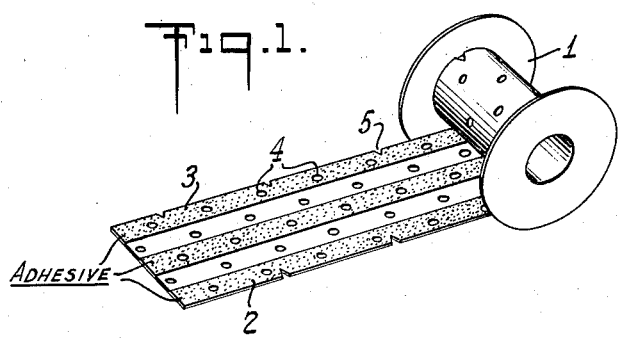
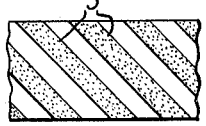
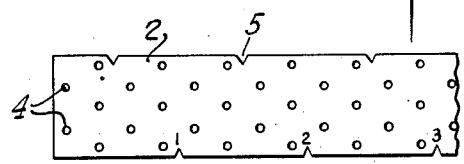
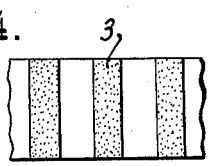
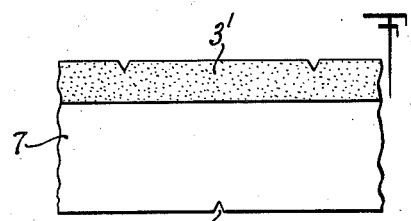
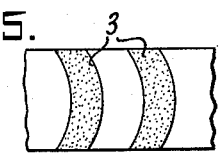
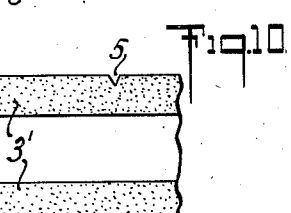
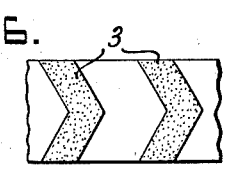
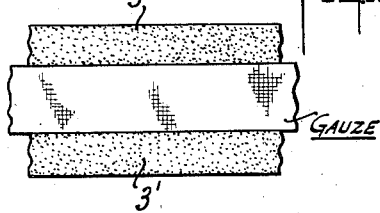
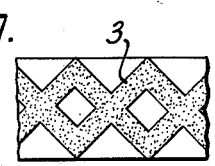
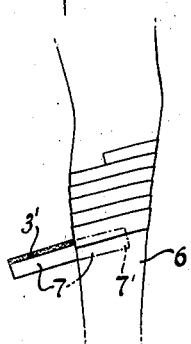
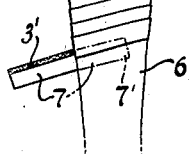
INVENTOR
BERNARD E. DAVIS.
BY
ATTORNEY Patented Apr. 30, 1946

2,399,545

UNITED STATES PATENT OFFICE 2,399,545

ADHESIVE TAPE

Bernard E. Davis, Brooklyn, N. Y.

Application November 18, 1942, Serial No. 466,085

1 Claim. (Cl. 128—156)

My present invention relates to improved adhesive tape adapted for application to a portion of the body, either directly to the skin or over a dressing.

Present-day adhesive tape, whether on rolls or in sheets, is difficult to tear without using a blade, shears, or other cutting instrument. Furthermore, it is necessary to guess as to the required length of tape to be cut off. When applied over a dressing, present-day tape obstructs the flow of air to the portion of the body under treatment.

Accordingly, it may be stated to be an important object of my present invention to provide a length of adhesive tape which is perforated throughout its length at predetermined spacings, in such a manner that its tensile strength will not be appreciably reduced, and the perforations will provide free access of air to the part treated and accelerate healing. Nicks, V-shaped indents, or any other suitable forms of subdivision indications, are provided on opposite edges of the tape at equal intervals whereby any desired length may be easily torn off. The perforations are sufficiently spaced from these indications to permit a clean tear, and leave sufficient tape beyond the line of perforations to stick to the skin.

Another problem encountered in using adhesive tape is the pain of removal of such tape from the skin. Where hair covers the skin, removal of the tape therefrom is agonizing. It can be stated, therefore, that another important object of my invention is the provision of an adhesive tape for surgical, medical, hospital, veterinary or emergency use of any kind, or for home application, wherein the adhesive, or tacky, coating consists of spaced bands, or areas, of a predetermined pattern designed to facilitate removal without appreciable reduction of adhesive quality.

Another important object of my invention is to provide an adhesive sheet, or tape, having an adhesive coating which consists of spaced areas of a predetermined pattern, and means being provided to permit ready and accurate subdivision of the sheet, or tape, the latter also being perforated according to a predetermined plan to provide sufficient air circulation without interference with the aforesaid subdivision.

Another object of my invention is to provide an adhesive tape, adapted for strapping, wherein the adhesive coating is applied to the backing in spaced longitudinal bands thereby to provide adequate immobilization and very easy removal from the skin with minimum pain.

Still another, and equally important, object of this invention is to provide an adhesive tape for spirally strapping body extremities, or any other portions of the body, and wherein the adhesive coating is applied in a longitudinal band along one edge only of the tape, so that only the first spiral of adhesive will contact the skin.

Other, and additional, objects of my invention will become manifest to those skilled in the art of manufacturing adhesive tape from a reading of the following detailed description.

In the drawing:

Fig. 1 shows in perspective a spool of adhesive tape embodying one form of the invention, Fig. 2 shows the uncoated face of the tape of Fig. 1, Figs. 3 to 7 inclusive show respectively different adhesive coating patterns which may replace the pattern of Fig. 1, Fig. 8 shows a form of tape adapted for spiral strapping, Fig. 9 illustrates the manner of using the tape of Fig. 8, Fig. 10 shows a form of adhesive tape adapted for general strapping use, Fig. 11 illustrates a modification of the tape shown in Fig. 10.

Referring now to the accompanying drawing, wherein like reference numerals denote similar elements, the spool of Fig. 1 is of a conventional form generally encountered in the rolling of adhesive tape. Since the tape is uniformly constructed along its entire length, it is only necessary to show the initial portion thereof. The tape 2, as is well known, generally comprises a fabric backing having one face completely coated along its entire length with an adhesive material. In the past, whether the product was in the form of narrow or wide tape, or in sheet form, the following disadvantages existed:

1. Subdivision of a length of tape into smaller sections was difficult without shears or other cutting instrument, and even with such the user had to guess at the desired length.

2. The tape was imperforate thereby blocking air circulation to the covered area and retarding healing.

3. Removal of the adhering tape from the skin was a highly trying and painful ordeal.

Now, in accordance with my invention all these disadvantages are readily and simply eliminated without appreciably reducing adhesive power, or tensile strength and retaining all advantages of economy. Generally, I secure the advantages of my invention by employing spaced nicks 5 to facilitate subdivision; perforations 4 to provide ready access of air to covered skin areas, but without interfering with the function of the nicks 5; and spaced bands, or areas, of adhesive coating greatly to reduce the overall adhesive surface thereby economizing in adhesive material and minimizing removal pain, but without reducing the effective adhesive power of the tape.

Considering the tape of Figs. 1 and 2 more specifically, the backing is preferably a flexible backing layer consisting of a closely woven fabric. The fabric may be thin, as for home-made finger or toe dressings, or it may be thick as for strapping legs, or arms or backs. The backing fabric may be waterproofed or rubberized. Indeed, the backing may be of paper of high tensile strength or other known suitable material. The adhesive material may be applied in various patterns of spaced bands, or areas 3 alternating with uncoated bands or areas. Figs. 1, 3 to 7 show such different patterns. The adhesive material may be any well known in the art. Any tacky adhesive, or material capable of being rendered actively adhesive by heat, pressure, or moisture, may be used. If desired, the adhesive may be medicated.

In Fig. 1 the bands 3 are shown arranged in longitudinal spacing. As many bands as desired may be employed; the relative areas of coated and uncoated surface will depend on the use to which the tape is to be put. The adhesive power of the tape will not be appreciably reduced, due to the spaced bands. The nicks 5, shown as V-shaped indents, may be spaced equidistantly and alternately along the opposite tape edges. Of course, any other form of subdivision indications may be used in place of the nicks. The spacing along each edge is uniform, and of any desired dimension, as for example 1 inch. Hence, in the latter case, lateral division lines from each nick to the opposite edge will have a one-half inch spacing. This permits accurate estimation of the tape length desired.

On the uncoated face of the tape, as shown in Fig. 2, there may be provided indicators adjacent the nicks of one or both edges. These indicators can correspond to the distance in inches from the leading edge of the tape. By way of illustration, the 1 inch, 2 inch and 3 inch nicks are illustrated. Other forms of scalar indication may be provided, if desired. For example, the ruler representation could be run along the middle of the uncoated surface in a longitudinal sense.

The perforations, or apertures, 4, are shown in lateral alignment. It is desirable to keep the lateral lines of apertures on either side of each nick "line" sufficiently away to permit a clean tear along the "line." The lateral lines of apertures may be uniform as to numbers of apertures. What is important is that the entire length of the tape may be perforated to provide lines of predetermined apertures, the lines of apertures being spaced uniformly or not. The apertures, however, should not be chosen or arranged to reduce the tensile strength of the tape.

It can now be seen that when a subdivided section of tape is superimposed on gauze to provide a home-made surgical dressing, the perforations 4 will provide free access of air to the part treated and accelerate the healing process. Further, any length of tape expressible in multiples of one-half inch may be torn off by virtue of the nicks 5. The equal spacing of the nicks renders the tape particularly adaptable for home use, emergencies, for the medical practitioner, hospitals, veterinarian, and for the armed services at home or in the field.

It is to be clearly understood that while the three features discussed above, viz., nicks, perforations and spaced adhesive bands, cooperate to provide a highly improved and efficient adhesive tape, yet these features may be used separately, if desired. Thus, the adhesive coating may appear as shown, while omitting the nicks or perforations; or the coating pattern may be used with either of the first two features. Again either, or both, the nicks and perforations may be used in adhesive tape with the conventional co-extensive form of adhesive coating.

Figs. 3 to 7 inclusive show respectively different types of adhesive patterns which may replace the pattern of Fig. 1. These patterns are self-explanatory. It will be understood that the tapes in each of Figs. 3 to 7 may be provided with the nicks and/or apertures. Such illustration of these latter features is omitted in order to simplify the disclosure. In these various modifications the adhesive power is not greatly reduced, while as much as 50% in amount of adhesive material may be saved.

In the case of spiral strapping of an extremity or any other portion of the body, where the adhesive tape comes in direct contact with the skin, it is well known how painful the removal of the bandage, or strapping, can be. As shown in Fig. 9, the portion of a leg 6 below the knee has applied to it a continuous spiral of adhesive tape. The conventional adhesive tape in such cases adheres to the skin wherever each spiral extends beyond the overlap portion thereof. In other words, each turn of the conventional tape in that case has the upper section thereof adhering to the turn preceding, and the lower section adheres to the skin. Removal of the tape causes much pain.

According to my invention, the adhesive material 3' (Fig. 8) is applied in a relatively narrow strip all along the tape 7 adjacent one edge only. The remainder of the tape is uncoated. However, the uncoated portion may be covered with gauze, if desired. When wound spirally on the limb, only the first spiral of adhesive will contact the skin. The remainder of the tape will not adhere to the skin. Each adhesive band 3' will be adhesively secured to the section of the tape immediately subjacent thereto. The end 7' can be taped fast with a piece of adhesive tape. The nicks 5 may be used as shown. The perforations 4 may, also, be used, and in the manner shown in Figs. 1 and 2. The strapping with this type of tape will be as secure as with the conventional spiral tape.

In Fig. 10 I have shown a modification of the tape of Fig. 8. Here, the adhesive bands 3' are applied to each edge of the backing along its entire length. The center portion is uncoated. This form of tape is best suited for extensive strapping of a portion of the body, as the back. The ends of a strip of tape of this type may be securely anchored by small strips of adhesive tape. If desired, the central area of Fig. 10 may be covered by a single thickness of gauze, as depicted in Fig. 11. Either form of tape of Figs. 8, 10 and 11 will provide adequate immobilization and very easy removal of the tape from the skin.

The invention is capable of various modifications and changes, all of which are comprehended within the scope of the appended claim.

What I claim is:

An article of manufacture comprising a backing provided with a plurality of spaced restricted areas of adhesive coating arranged according to a predetermined pattern, said backing being provided with a plurality of equidistantly spaced lateral rows of air-circulation perforations, a series of spaced nicks provided along each edge of the backing in opposed relation, said opposed nicks being in alternate relation as regards nick spacing, and said nicks being equidistantly located between successive lateral rows of said perforations whereby said backing may be severed in alignment with nicks and between lateral rows of perforations.

BERNARD E. DAVIS.